United States Patent [19]
Hirschman et al.

[11] Patent Number: 5,793,463
[45] Date of Patent: Aug. 11, 1998

[54] UNIVERSAL ATTACHMENT WITH MOVEABLE SIDESHIELDS FOR EYEGLASSES

[75] Inventors: Richard Hirschman, Bohemia, N.Y.; Chang Wan Kang, Masan, Rep. of Korea; Ji Woong Kim, Masan, Rep. of Korea; Jae Bong Sim, Masan, Rep. of Korea

[73] Assignee: Pareto Corporation, Bohemia, N.Y.

[21] Appl. No.: 767,191

[22] Filed: Dec. 16, 1996

[51] Int. Cl.⁶ .................................................. G02C 9/00
[52] U.S. Cl. .................................. 351/47; 351/44
[58] Field of Search .......................... 351/41, 121, 111, 351/158, 44, 47, 57; 2/13, 12

[56] References Cited

U.S. PATENT DOCUMENTS

| | | | |
|---|---|---|---|
| 2,229,342 | 1/1941 | Rux | 2/13 |
| 2,253,101 | 8/1941 | Thoreson | 2/13 |
| 2,281,129 | 4/1942 | Wolff | 2/13 |
| 2,403,223 | 7/1946 | Kaesz | 2/13 |
| 2,823,385 | 2/1958 | Watkins | 2/13 |
| 2,840,821 | 7/1958 | Gay, Jr. et al. | 2/13 |
| 2,900,639 | 8/1959 | Lindstrom | 2/13 |
| 2,932,066 | 4/1960 | Lindblom | 18/59 |
| 3,165,754 | 1/1965 | Rodgers, Jr. et al. | 2/13 |
| 3,436,761 | 4/1969 | Liautaud et al. | 2/13 |
| 3,505,679 | 4/1970 | Bennett | 2/13 |
| 4,785,481 | 11/1988 | Palmer, III et al. | 2/436 |
| 4,952,043 | 8/1990 | Werner et al. | 351/47 |
| 5,170,502 | 12/1992 | Hegendorfer et al. | 2/13 |
| 5,264,875 | 11/1993 | Cooper | 351/47 |
| 5,388,269 | 2/1995 | Griffin | 2/13 |
| 5,394,567 | 3/1995 | Vatterott | 2/449 |
| 5,402,189 | 3/1995 | Gill | 351/44 |
| 5,426,473 | 6/1995 | Riehm | 351/121 |
| 5,438,706 | 8/1995 | Lambur | 2/13 |

Primary Examiner—Hung X. Dang
Attorney, Agent, or Firm—Ostrolenk, Faber, Gerb & Soffen, LLP

[57] ABSTRACT

A universal sideshield attachment for eyeglasses which comprises a central supporting member attachable to the eyeglasses by clips which fit over the bridge of the eyeglasses and engage the lenses thereof. First and second telescoping members are slidably received in first and second passage ways located within the central supporting member. First and second sideshields are respectively connected to the first and second telescoping members. The first and second telescoping members are movable within the respective passageways so that the distance between the eye shields can be adjusted to the width between the temples of the eyeglasses. Each sideshield is pivotally attached to its respective telescoping member to enable a more optimum fit between the sideshields and the temples to be achieved.

7 Claims, 4 Drawing Sheets

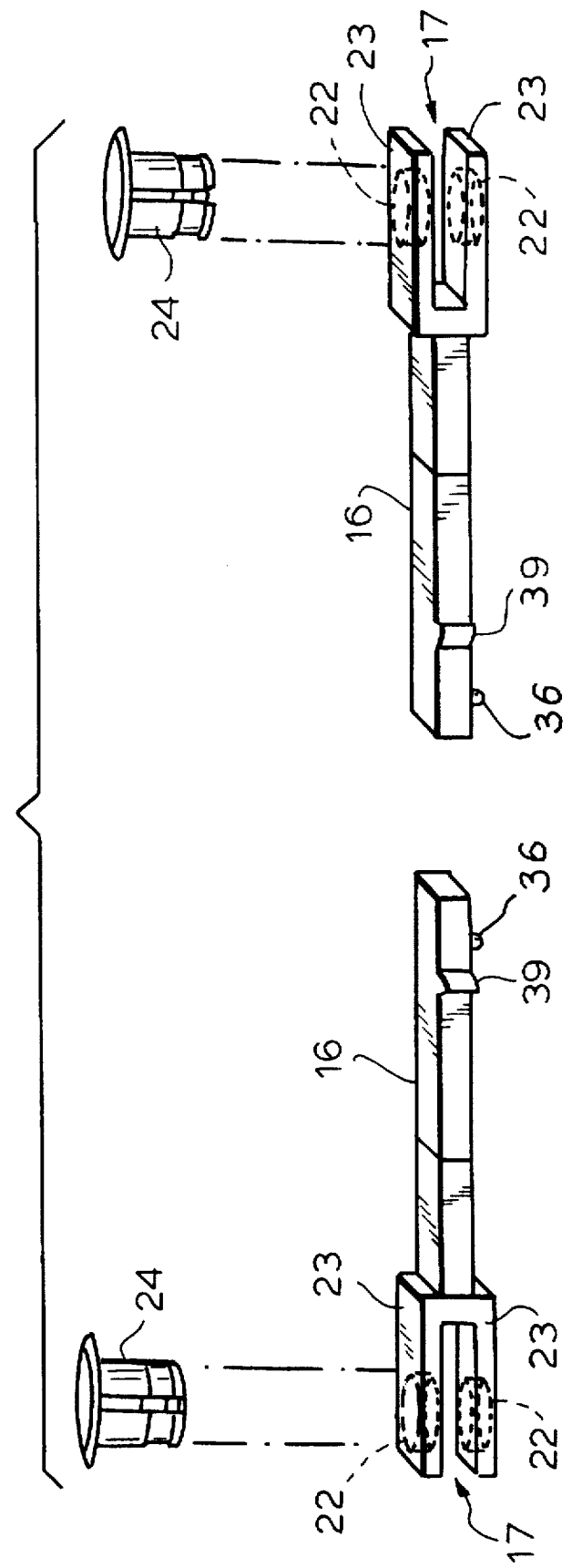

UNIVERSAL ATTACHMENT WITH MOVEABLE SIDESHIELDS FOR EYEGLASSES

BACKGROUND OF THE INVENTION

The present invention relates to safety sideshields for eyeglasses and, in particular, to a universal sideshield attachment that can be adjusted to fit nearly all sizes of eyeglasses.

Conventional safety eyeglasses generally includes side safety shields which are either permanently or removeably fixed to the temples. The sideshields are generally custom fit to the eyeglasses of the user. However, custom fitting of sideshields is not always feasible. Thus, a factory or other establishment may have a transient need for sideshields for an employee or visitor and, therefore, may need temporary eye shields. However, temporary eye shields, which would be affixed to the eyeglasses like conventional eye shields, that is, affixed to the temples of the glasses, present problems in that the temples of eyeglasses are too unpredictable. For example, some temples are positioned high up on the frame; others very low down, many more or less in the mid part of the eye range. Some temples are very narrow, others are very wide. Some are made of thin metal, others are made of thick plastic.

It is an object of the present invention, therefore, to provide a universal sideshield attachment that can be easily attached and adjusted to fit nearly all size eyeglass frames and temple structures and arrangements.

SUMMARY OF THE INVENTION

The foregoing and other objects are accomplished in accordance with certain principles of the present invention by a universal sideshield attachment for eyeglasses which includes a supporting structure having first and second opposed ends. First and second sideshields are attached respectively to the first and second opposed ends of the supporting structure. An attaching arrangement is provided for attaching the supporting structure to a pair of eyeglasses at a bridge area thereof.

Other features and advantages of the present invention will become apparent from the following description of the invention which refers to the accompanying drawings.

BRIEF DESCRIPTION OF THE DRAWING(S)

FIG. 4 is an exploded, perspective view of telescoping extension members and pins used to attach the telescoping extension members to sideshields.

DETAILED DESCRIPTION OF THE PREFERRED EMBODIMENT(S)

Figure 1:
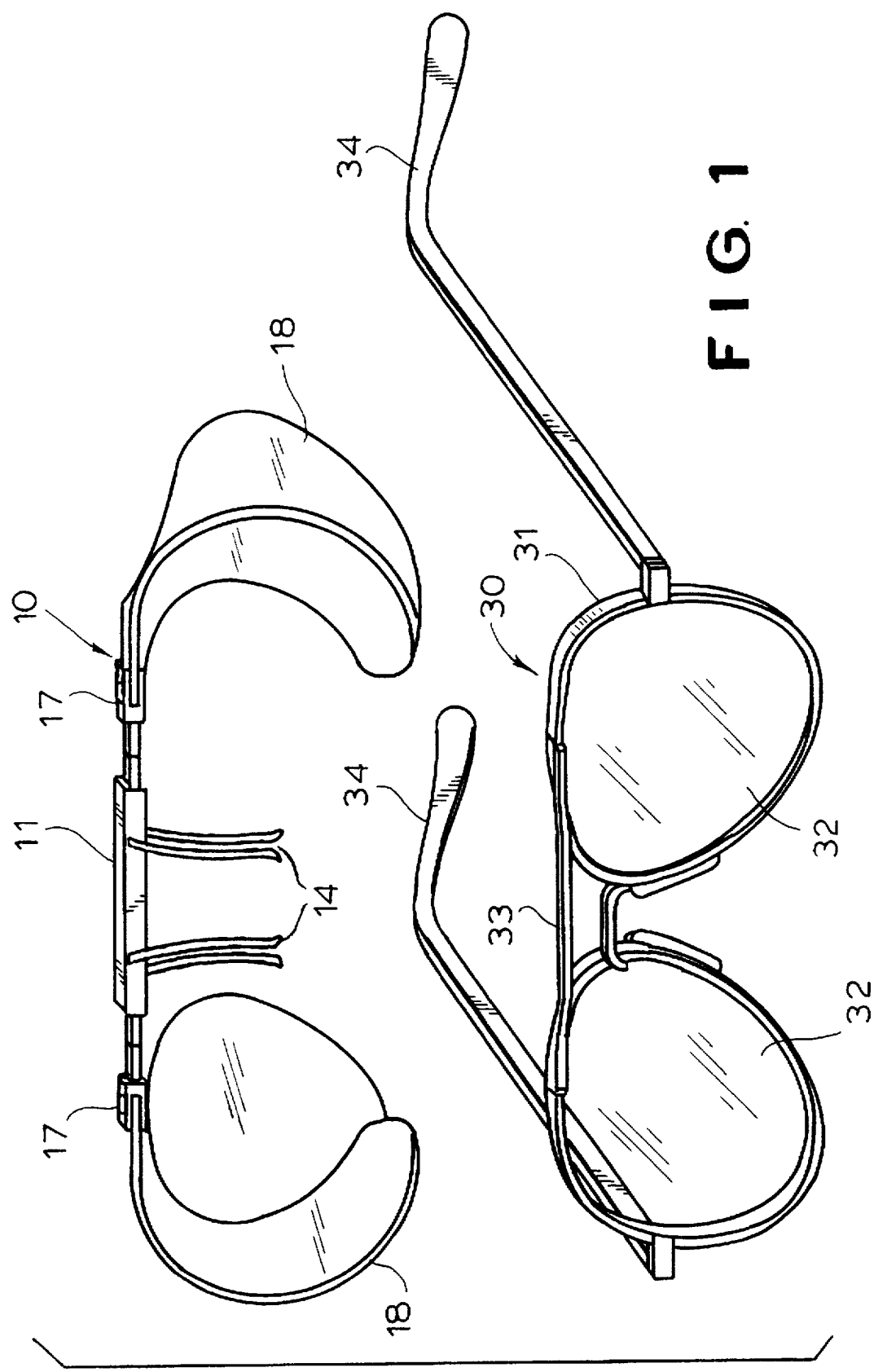
FIG. 1 is an exploded perspective view of a universal sideshield attachment in accordance with the present invention and a conventional pair of eyeglasses.
Figure 2:
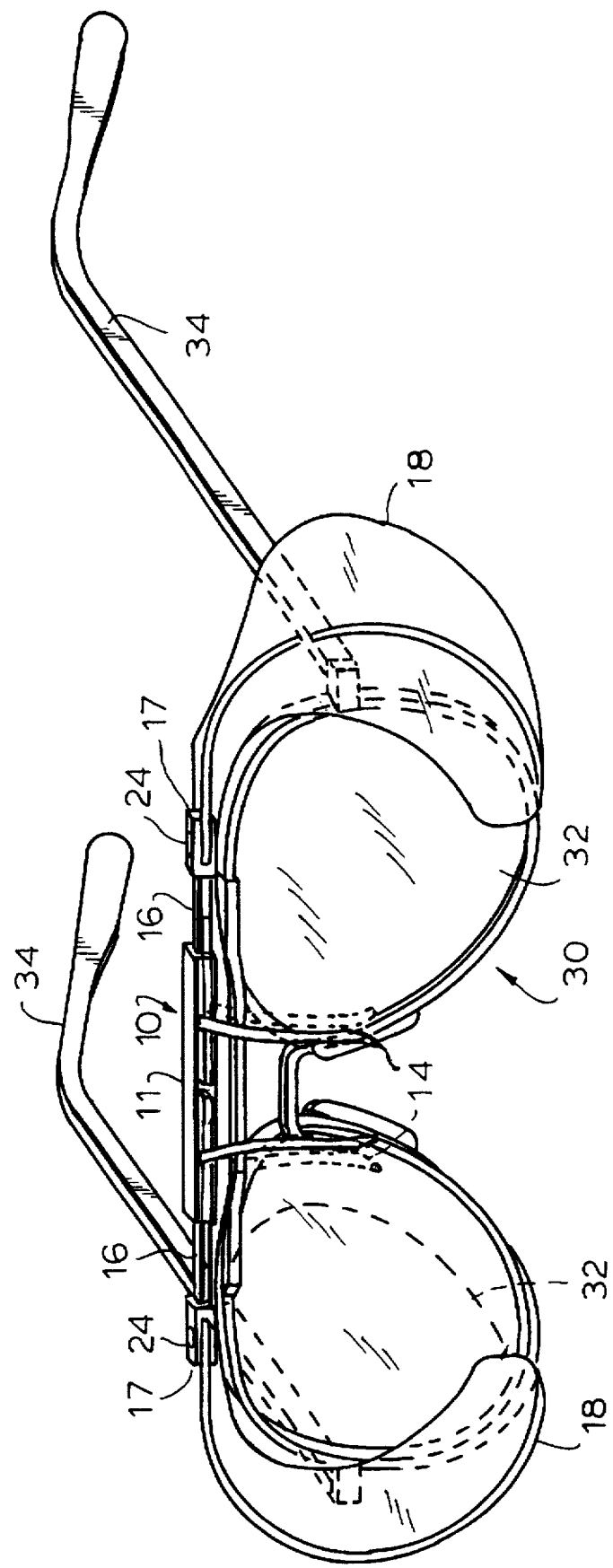
FIG. 2 is a perspective view of the universal sideshield attachment attached to the eyeglasses.

Referring now to the drawings and, in particular, to FIGS. 1 and 2, there is shown a universal sideshield attachment 10 which embodies certain principles of the present invention and which is structured and arranged to attach to a conventional pair of eyeglasses 30.

The eyeglasses 30 include a dual lens eyeglass frame 31 with lenses 32, 32 mounted therein, a bridge 33, and temples 34.

Figure 3:
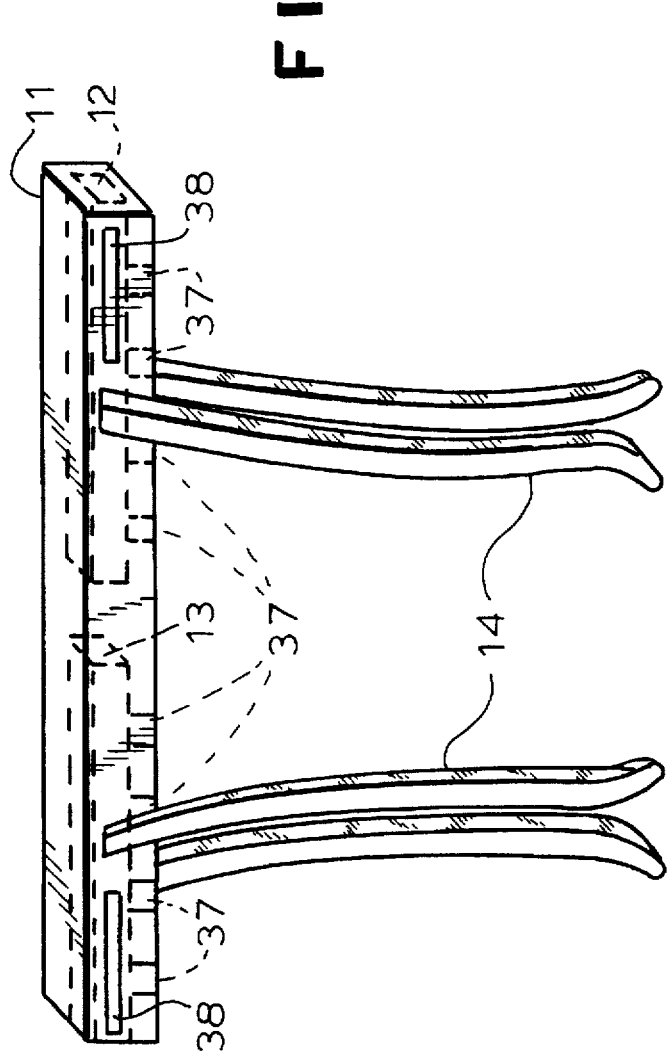
FIG. 3 is a perspective view of a support member forming part of the universal sideshield attachment.
Figure 5:
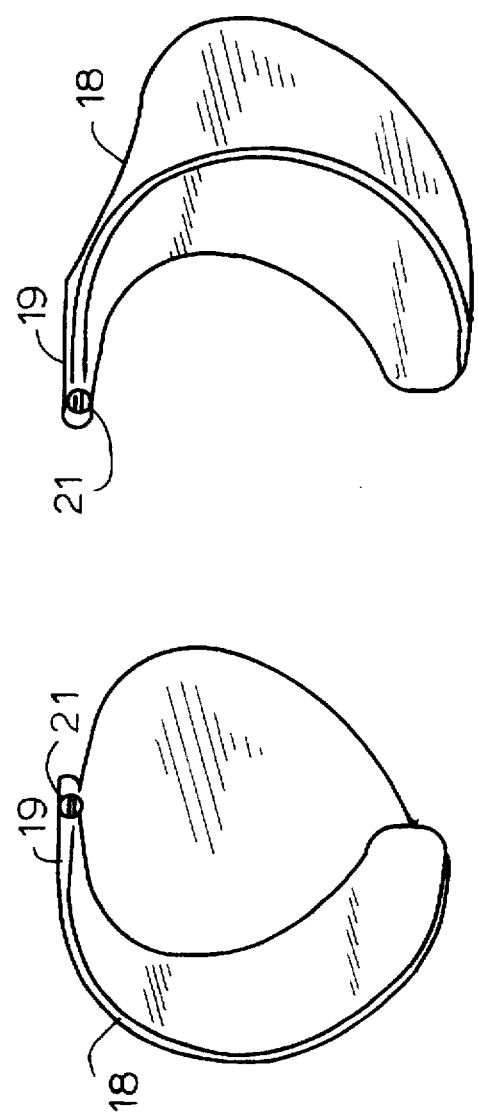
FIG. 5 is a perspective view of sideshields employed in the universal sideshield attachment shown in FIGS. 1 and 2.

The universal eye shield attachment 10 includes a central support member 11, which as best seen in FIG. 3, contains first and second passageways 12 and 13 extending inwardly from opposed ends of the support member. As should be appreciated, although the passageways 12 and 13 are shown as separate, they may form parts of a single continuous passage.

The support member 11 also includes two pairs of clips 14, 14 which are adapted to fit over the bridge 33 of the frame 31 and clip onto the lenses 32, 32. More specifically, the clips 14, 14 are flexible and are retroflexed such that they can spring apart to pass over the bridge 33 and then spring back to grip the lenses 32, 32 with sufficient pressure to positively attach the universal sideshield attachment 10 to the eyeglasses 30.

The universal sideshield attachment 10 also includes first and second telescoping members 16, 16 which are slidably received in the internal passageways 12 and 13. Each of the telescoping members 16, 16 has a bifurcated end 17 for receiving a sideshield 18 therebetween. More specifically, each sideshield 18 includes a flange 19 and a hole 21 therein which is adapted to mate with holes 22, 22 in the bifurcations 23, 23 of each bifurcated end 17 of the associated telescoping member 16 so that when the flange 19 of the sideshield 18 is received between the bifurcations 23, 23, the holes 22, 22 in each bifurcation 23 and the hole 21 in the flange 19 of the associated sideshield 18 are in alignment. A pin 24 is inserted into the holes 21, 22, 22 to connect a sideshield 18 to its associated telescoping member 16.

As should be appreciated, each sideshield 18 must be on the exterior side of its associated temple 34 and should closely overlie the temple 34 in order to provide optimum protection. According, it is desirable to provide a pivoting connection between each sideshield 18 and its associated telescoping member 16 to enable the sideshield to pivot into close engagement with the temple 34 and provide a more optimal fit therebetween. To this end, the fit between the hole 21 of each flange 19 and its associated pins 24 is such that each flange 19, and hence each sideshield 18, can pivot about its associated pin 34.

The pins 24, 24 may be simple pins made of plastic or metal, as shown in FIG. 4, or may be ratcheting types of devices which enable the sideshields 18, 18 to stay stationary once adjusted.

In operation, the universal sideshield attachment 10 is attached to the eyeglass frames 30, which may be of any style, by fitting the clips over the bridge and engaging the clips 14, 14 with the lenses 32, 32. It should be appreciated that the universal sideshield attachment may not actually be attached to the bridge. Depending on the configuration, the attachment 10 may only be resting on the bridge, although it may in other eyeglass configurations be attached to the top bar or bridge brace (as is well known some eyeglass frames have two bridges, the upper one being known as the top bar or bridge brace). Thus, the universal sideshield attachment is attached to the frame 30 at what may be referred to as the bridge area. Then, the telescoping members 16, 16 are moved inwardly or outwardly in order to adjust the width of the sideshields 18, 18, that is, to adjust the space between the sideshields 18, 18 so that it is substantially equal to the space between the temples 34. The sideshields 18, 18 are then pivoted on the pins 24, 24 so that they are closely aligned with the temples 34, 34.

Advantageously, the telescoping members 16, 16 may have respective protrusions 36 which cooperate with openings 37 formed in the central support member to selectively locate and releaseably fix the positions of the telescoping members 16, 16 in the passageways 12 and 13, respectively. Additionally, horizontal slots 38, 38 are formed in sidewalls of the passageways 12 and 13. The slots 38, 38 cooperate with respective stop members 39, 39 formed on the sides of the telescoping members 16, 16 to prevent the members from being pulled all the way out of the central supporting member 11.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A universal sideshield attachment, comprising:

a supporting structure, the supporting structure being attachable to the frame of a pair of eyeglasses having a pair of temples;

first and second sideshields; and respective pivot mechanisms for pivotably attaching the first and second sideshields to opposite ends of the supporting structure to enable alignment of each sideshield with a respective one of the temples.

2. A universal sideshield attachment, comprising:

a central supporting member having first and second passageways extending inwardly from opposing ends of the supporting member;

first and second telescoping members received respectively in the first and second passageways;

first and second sideshields attached respectively to the first and second telescoping members;

the central supporting member being attachable to a pair of eyeglasses having a frame, a bridge, a pair of lenses and a pair of temples; and the first and second telescoping members being moveable within the first and second passageways to adjust the width of the universal sideshield attachment to approximately the width of the eyeglass frame at the temples.

3. A universal sideshield attachment in accordance with claim 2, wherein the first and second telescoping members are slidable within the first and second passageways.

4. A universal sideshield attachment in accordance with claim 3, further including clips attached to the central supporting member and engageable with the lenses of the eyeglasses to attach the universal sideshield attachment to the eyeglasses.

5. A universal sideshield attachment according to claim 4, wherein the first and second sideshields are pivotably connected respectively to the first and second telescoping members.

6. A universal sideshield attachment according to claim 4, wherein:

each telescoping member includes a bifurcated end, each bifurcation having a hole therein;

each sideshield has a flange with a hole therein, each flange being received between the bifurcations of an associated bifurcated end so that the hole in each flange is aligned with the holes in the associated bifurcations; and a pin is received within the aligned holes of each flange and the associated bifurcations such that each flange may be pivoted about its associated pin.

7. A universal sideshield according to claim 6, wherein the telescoping members include protrusions to prevent the telescoping members from being freely slidable within the first and second passageways.

\* \* \* \* \*